(No Model.)
J. R. McPHERSON
Stock Car.
No. 239,527. Patented March 29, 1881.
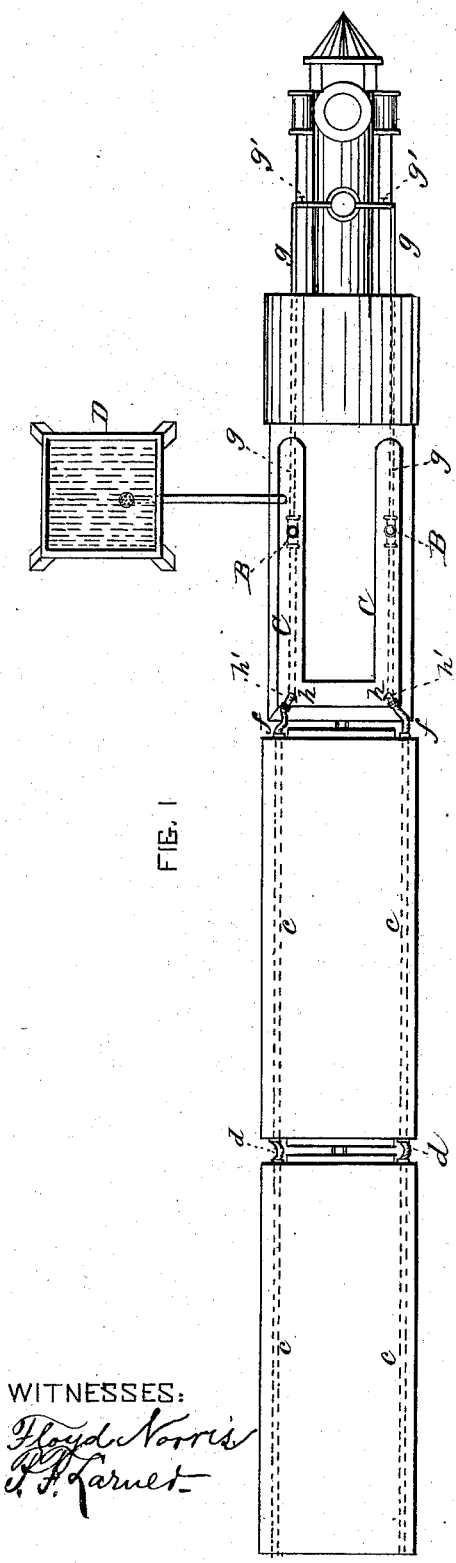
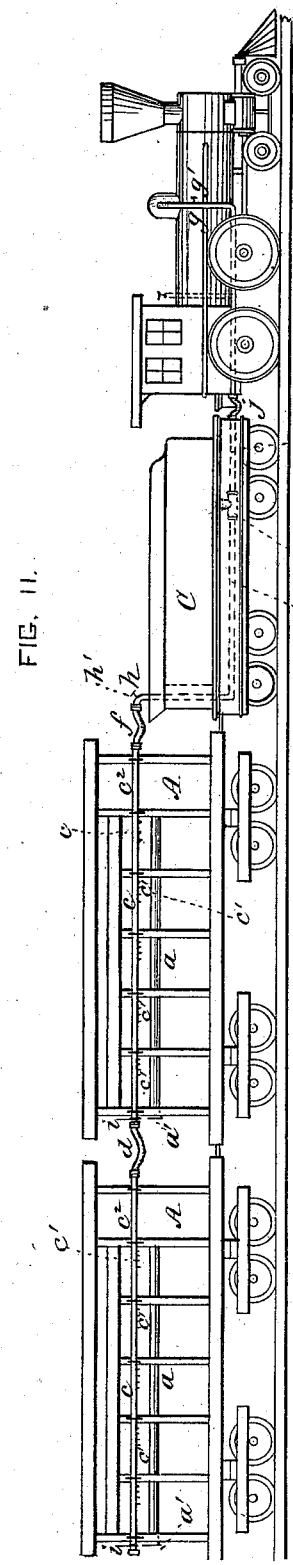
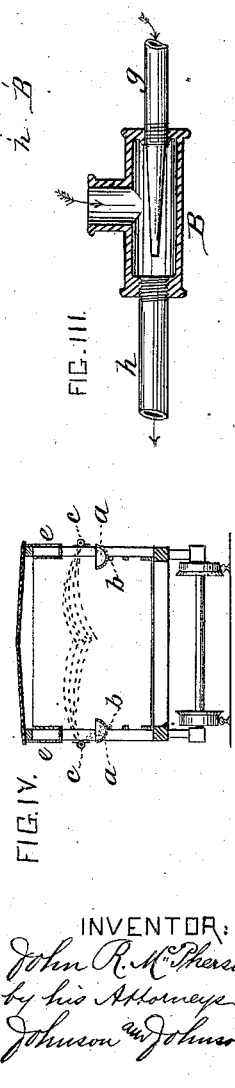
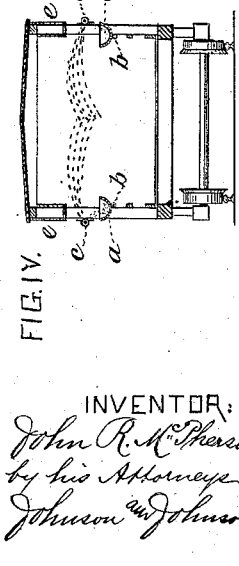
WITNESSES:
Floyd Norris
J. F. Larnet
INVENTOR:
John R. McPherson
by his Attorneys
Johnson and Johnson

UNITED STATES PATENT OFFICE.

JOHN R. McPHERSON, OF SEA BRIGHT, NEW JERSEY.

STOCK-CAR.

SPECIFICATION forming part of Letters Patent No. 239,527, dated March 29, 1881.

Application filed December 1, 1880. (No model.)

*To all whom it may concern:*

Be it known that I, JOHN R. MCPHERSON, a citizen of the United States, residing at Sea Bright, in the county of Monmouth and State of New Jersey, have invented new and useful Improvements in Watering Stock in Cars, of which the following is a specification.

In the transportation of live stock by rail I propose to water and to cool the animals in the cars by forcing water through a car or the train by using the steam-power of the locomotive to supply the train from the water-tanks of the engine-tender, thus effecting the watering of a stock-train with little or no cost as to labor, and supplying the water under a pressure that will force it quickly into the distributing-pipes of each car.

In the utilization of steam-power for watering stock I employ ejectors connected with the steam-generator and with the tanks of the tender, and the latter are connected with the distributing-pipes of the entire train, so that the force of the steam can be applied to displace or draw the water from the tanks and send it through the cars, being an improvement in the means and method of watering stock carried in cars, whether standing or in motion. This method also slightly warms the water and prevents it freezing in the distributing-pipes in seasons of extreme cold. The means employed for watering the stock I also employ for sprinkling and cooling the stock in the summer season—that is to say, I use the pipes for supplying the watering-troughs as the means for directing a shower over and upon the animals from each side of the car, and I drive the water for this purpose from the tender-tanks by steam-pressure or equivalent force, such as an air or a hydraulic ejector or ejectors.

Referring to the accompanying drawings, Figure I represents, in top view, the locomotive, the tender, and two cars, in connection with my new method of watering stock direct from the tanks of the engine-tender; Fig. II, a side elevation of the same; Fig. III, a detail of the ejector as the means of utilizing the steam-power to force the water from the tender-tanks into the connected distributing-pipes of the several cars; and Fig. IV a cross-section of a car, showing the relation of the distributing and sprinkling pipes with the drinking and feeding troughs and the food-bins.

The troughs $a$ are for both food and water, and are arranged in the walls on both sides of the car, preferably in sections between the wall-studs, and carried by pipes $b$ mounted in bearings in said studs, so that they can be turned by levers $a'$ in position to feed and water, and when not in use turned outwardly, so that they will occupy as little room within the car as possible. The troughs are of boiler-iron, and suitably secured to their carrying-pipes, as in my patent of September 21, 1875.

For supplying the troughs with water suitable pipes $c$ are secured along each side of the car, over the troughs, and suitably supported and provided with outlets $c'$, so as to direct the water into the troughs, as in the Steventon and McGrath patent of September 21, 1875, which I own. These pipes may be arranged on the inner or the outer sides of the car-walls; but they must be so mounted as to allow them to be turned in their bearings, so as to be used for sprinkling the stock. The doorways A, I prefer to arrange at one end, on each side of the car; but they may be placed in the middle, or in alternate end positions on each side.

In cars for cattle and horses the water-distributing pipes $c$ are arranged quite high up in the sides, and at their crossings of the doorways they may be provided with jointed sections $c^2$, to obtain direct line-connections throughout the train, and to allow them to be turned out of the way for ingress and egress; but as the pressure under which the water is forced from the tanks is sufficient to send it rapidly through all the pipes of the train, the doorway-sections $c^2$ may cross over above the doors. The ends of the pipes at each side of the car are provided with suitable couplings for hose-connections $d$ between the cars, so as to make these pipes continuous throughout the train. In such cars the troughs do not cross the doorways.

For small stock the pipes and troughs of both floors of a double-deck car cross the doorways, and the pipe-connections are made continuous in any suitable way.

Instead of connecting the side pipes to render their communication continuous throughout the train, I may arrange a pipe or pipes in the top of each car, and by hose-connections between the cars make continuous connections throughout the train, and connect such pipe of each car with the side distributing-pipes, c, by couplings, which will allow the said distributing-pipes to be turned in their bearings.

The conveniences for supplying food may be such as shown and described in my said patents, in which supply-bins e are arranged in the side walls, with tubes or sluices leading therefrom in positions to discharge the corn or other grain into the troughs and control such distribution. In other matters the cars may be constructed suitably for the transportation of live-stock; and having described and shown in such cars provisions for feeding and watering stock, I will now describe my new method and means of supplying the water under pressure from the tender-tanks.

I provide hose-couplings f for connecting the tender-tanks C to the ends of the distributing-pipes c, or to pipes arranged in the top of the car, connecting with said side distributing-pipes, and I arrange an ejector or ejectors, B, in proper relation to these hose-couplings, and connect them by suitable pipes g with the steam-boiler, so that when the steam communication with the ejectors is open the water will be drawn or forced from the tender-tanks, and, under considerable pressure, into and through the distributing-pipes of each car in the train, or of a single car. The pipe leading to the boiler, and the tank-pipes h connecting with the hose-couplings f, are provided with cocks to cut off and let on the steam and water communication when watering the stock. The tender-tanks are supplied from the usual elevated stand-tanks D at the stations along the line, and the watering and the sprinkling of the stock may be made at the station when the train is standing, and while the tanks are being filled, or while the train is in motion, and from the filled tender-tanks.

The principle upon which the ejector acts to create a vacuum and force the water from the tanks and into the distributing-pipes is well understood, and the tender-tanks may have capacity to carry water enough to supply the boiler and to water the stock while the train is in motion. The openings c' in the pipes c are arranged so as to direct the water into the troughs; but the pipes are fitted in their bearings and to their connections, so as to allow them to be turned to present these perforations inward, so as to project a shower of water from each side of the car over and above the animals, to cool and refresh them in hot seasons, as illustrated in Fig. IV. As only a few perforations are necessary in the pipes to supply the separate troughs, I make such perforations so as to divide and equalize the streams from each side of the car, so that I also use the tender-tanks and the ejectors with the distributing-pipes as the means of cooling the stock. While the water will be sufficiently warmed by the action of the steam-ejectors in forcing it from the tender-tanks to prevent freezing in the distributing-pipes, it will not be thereby made too warm for drinking, and for being used for sprinkling in hot weather.

The pipes c are provided with hand-levers i, by which to turn them in positions for sprinkling and for supplying the troughs.

Any suitable arrangement of water-distributing pipes, and means for forming a continuous connection throughout the train, may be adopted in place of that which I have shown, so long as such pipes connect with and are supplied with water from the tender-tanks by the action of steam-ejectors or equivalent force.

The hose-connections d and f may extend across the doorways, and thus dispense with the jointed sections $c^2$ of the distributing-pipes.

In using a single pipe-connection with the cars and the tender-tanks, a single ejector will be sufficient, and the pipe-connections with the tender-tanks and with the steam-generator may be arranged in any suitable way and connected by a hose-coupling, j, as shown in Fig. II.

The pipe g has a cock, g', by which to operate the ejector, and the pipe h may have a supplemental cock, h', and, if found necessary, the ejector part proper may have a stop-cock communication with the water-tanks.

It will be understood that when only a single stock-car is used the uncoupled ends of the water-distributing pipes c c' are closed by caps, or otherwise, and that in continuous coupled distributing-piping the rear ends of such pipes of the rear car must be closed.

In cold weather the hose-couplings d f of the distributing-piping may be disconnected, after watering the stock, to drain the couplings and prevent them freezing.

The steam-cocks g' should be within control of the engineer, and the cocks h' of the tender-tank pipes may be dispensed with.

In my new conception, method, and combination, whereby water is distributed into drinking-troughs of stock-cars direct from the tanks of the locomotive-tender, the steam-ejector is the distributing force, and for this purpose it must have direct communication with the train distributing-pipes, and such relation to the tender-tanks as to take and force the water therefrom into all the distributing-pipes of the train, either while said tanks are being filled from the track-tanks and the train is standing, or from filled tender-tanks when the train is in motion.

In the employment of the usual tanks of the locomotive, through which to water stock in railway-trains, the operation can be effected in a short time at water-stations along the line, so that it will not be necessary to carry water for the purpose, to construct water-tanks for each car, or a separate car for water-tanks only, and it is of the last importance in railway economy not only to reduce the expense of train-hands, but to avoid carrying extra weight in water and heavy and expensive tanks for such purpose.

It is obvious that, as equivalent means for the steam-ejector, I may employ a compressed-air or a hydraulic ejector for forcing the water from the tender-tank to supply and cool the stock, and that, such ejectors being well known, a mechanic skilled in such matters can make the proper connections, and this is what I mean by "equivalent force," referred to herein.

I claim—

1. As a means for watering stock in cars, the combination of a steam, compressed-air, or hydraulic ejector or ejectors, with a distributing pipe or pipes, suitably arranged within a car or a train of cars, and communicating with the tender tank or tanks of the locomotive-tender, whereby water for the stock is forced from said tender-tank into said distributing-pipes, substantially as described.

2. In railway-cars for the transportation of live stock, the combination of the water-tanks of a locomotive-tender and a car or cars provided with distributing-pipes and drinking-troughs, with an ejector or ejectors arranged upon said tank or tanks, a pipe or pipes, $h$, connecting said ejector or ejectors with the said distributing-pipes, and a pipe or pipes, $g$, connecting the said ejector or ejectors and said distributing-pipes with the steam-chamber of the boiler, substantially as described, for the purpose specified.

3. In combination, a car or a train of cars, each provided with side-perforated distributing-pipes, $c\ c'\ c\ c'$, and drinking-troughs $a\ a$, the tanks C C of the locomotive-tender, the ejectors B B, arranged within said tanks, the pipes $h\ h$, and flexible couplings $f\ f$, connecting said tanks with the distributing-pipes, the ejector-pipes $g\ g$, connecting with the steam-chamber of the boiler, and the flexible couplings $d\ d$ for said distributing-pipes, whereby the troughs on each side of the train are supplied by direct pipe and ejector connections from said tender-tanks.

4. The combination, in a stock-car, of a steam ejector or ejectors, arranged within or upon the tanks of the locomotive, the pipes $g$ and $h$, and the couplings $f$, with distributing-pipes $c\ c'$, adapted to be turned in their bearings and upon the couplings which connect them with each other and with the tank ejector-pipes, substantially as described, for the purpose specified.

In testimony whereof I have hereunto set my hand in the presence of two subscribing witnesses.

JOHN R. McPHERSON.

Witnesses:
A. E. H. JOHNSON,
J. W. HAMILTON JOHNSON.